Jan. 12, 1965  R. F. SHARROW ETAL  3,164,888
METHOD OF MAKING COILS
Filed Oct. 30, 1961

INVENTORS
ROBERT F. SHARROW
BUDDY G. SPARKS
BY Robert H Montgomery
ATTORNEY

United States Patent Office 3,164,888
Patented Jan. 12, 1965

3,164,888
METHOD OF MAKING COILS
Robert F. Sharrow and Buddy G. Sparks, Erie, Pa., assignors to General Electric Company, a corporation of New York
Filed Oct. 30, 1961, Ser. No. 148,537
7 Claims. (Cl. 29—155.5)

The invention relates to manufacture of armature coils for dynamo-electric machines, and more particularly relates to a technique for improving the property of the insulation at the bends and knuckles of such armature coils.

It is common practice to use an insulated conductor of rectangular cross-section in forming armature coils where one dimension of the cross-section, the width, is substantially greater than the other dimension, the thickness. These conductors are commonly covered throughout their length with an inorganic fibrous material such as asbestos or glass fiber and a binder to hold the fibrous material together and seal the conductor against contaminants. The glass fiber may be applied over a filmed conductor or a previously non-insulated conductor. These insulating fibers are commonly referred to as serving, and the most common serving is glass. Conductors having this type of insulating coating are known in the art as "HFG" and also "DG."

In forming armature coils from rectangular crosssection conductor, it is the practice to first edgewise wind the conductor on a winding mandrel or fixture to form a predetermined number of turns. The wound conductor is then removed from the winding mandrel and placed in a pull-out or forming device where it is expanded and formed in a plane generally perpendicular to the plane in which it was wound, and with the coil sides, in the case of multiple turn coils, lying in a radial plane defined by the axis of the armature and the slots in which the coil sides will be positioned. In most cases several conductors forming a "bundle" are simultaneously wound and then formed or pulled out.

Use of the glass-served type of insulated conductor for armature conductors has posed a problem because edgewise bending of the rectangular conductor has split the insulation, thus requiring the turns to be patched and taped by hand, the patching being the insulating of adjacent or alternate conductors in a bundle, which is necessary because the glass-served insulation no longer adheres to the conductor and will fall away from the conductor. The taping is done to re-cover and secure the patches against the conductors still in a damaged state, and also improves the generally poor appearance of the patching. Splitting of the glass fiber may also occur at severe bends of the conductors about their larger dimensions. Additionally, the glass fiber may be ruptured by abrading of one conductor on another.

The splitting of the conductor insulation is caused by the conductor, usually copper, upsetting, i.e., becoming thicker adjacent the inner radius around which it is bent and thinning down at the outer radius of the bend. This causes the fiber at the outer radius to fracture in tension. Where armature coil leads emerge from armature core slots for connection to a current-collecting device, many cross-overs of conductors occur and contraction and expansion of the conductors due to heat often causes an abrading action between conductors which fractures the glass fibers.

It is therefore an object of this invention to provide an improved method of manufacturing an armature coil which does not require patching and taping of coil bends and knuckles, and protects against abrasion of coils at cross-over points of the conductors forming the coils.

Briefly stated, the invention in one form thereof comprises placing preformed tubes of a heat-shrinkable, nonrigid insulating material about a bundle of conductors before it is wound into a coil, locating the tubes at predetermined positions on the conductor bundle where edgewise bending or abrading action will occur, applying heat to the tubes to cause them to shrink and tightly grasp the conductor bundle, edgewise winding the rectangular crosssection conductor bundle into a coil, and then pulling out the coil sides to form the armature coil. The insulating tube which has been shrunk about the conductors tightly grasps the conductors at the resulting knuckles and bends and retains the insulation at the coil knuckles which has broken loose from the conductor due to the edgewise bending, and thus eliminates the necessity of patching and taping.

The features of the invention which are believed to be novel are pointed out with particularity in the appended claims. However, the invention, together with further objects and advantages thereof, may best be understood by reference to the following description taken in conjunction with the following drawings wherein—

Figure 1:
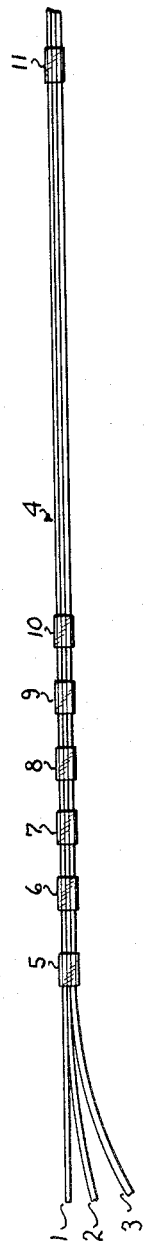
FIGURE 1 illustrates a bundle of conductors to be formed into an armature coil.

Reference is now made to FIG. 1, which illustrates three rectangular cross-section conductors 1, 2 and 3 of equal width and thickness, which are drawn from spools, not shown, to form a coil bundle 4 of the three conductors. The conductors 1, 2 and 3 have a glassserved insulation thereon which may be that commonly termed DG or HFG. Prior to bending the coil bundle 4 into an armature coil, pre-formed heat-shrinkable insulating tubes 5, 6, 7, 8, 9, 10 and 11 are slipped over the bundle 4 of conductors 1, 2 and 3. In bundle form the conductors 1, 2 and 3 are arranged with surfaces having the major dimension, width, in successive contact.

Figure 2:
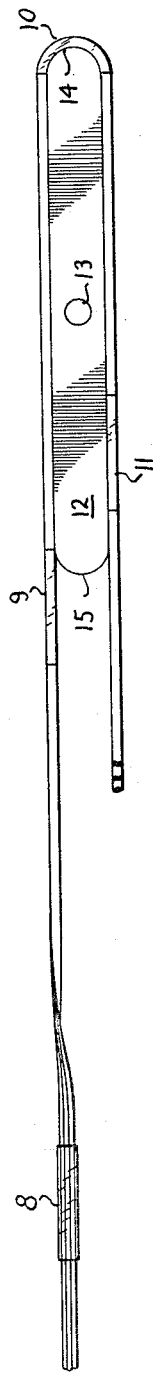
FIGURE 2 illustrates a step of edgewise winding the conductors to be formed into armature coils.
Figure 3:
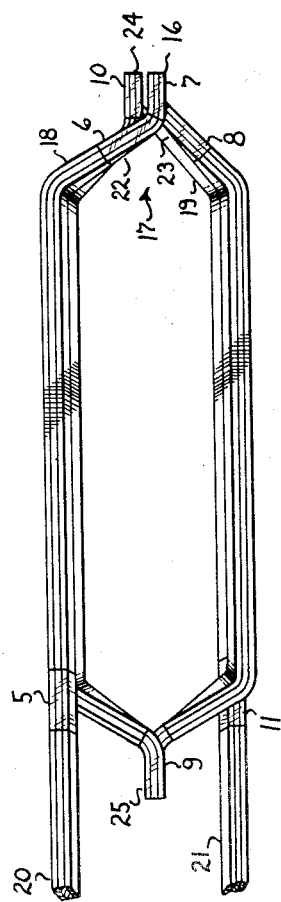
FIGURE 3 illustrates a formed armature coil manufactured in accordance with the invention.

The tubes 5, 6, 7, 8, 9, 10 and 11 are chosen to have a diameter related to the peripheral dimension of the conductor bundle, as hereinafter more fully discussed. Tube 11 is first positioned at a location on the conductor bundle which, upon completed forming of the coil, will be on a portion of the conductors which extend from armature slots, not shown, to be connected to a current-collecting device such as a commutator, not shown. When located at this predetermined point, tube 11 is heated and shrunk about conductor bundle 4 to tightly grasp the bundle 4 of conductors. In heating the insulating tubes to cause them to shrink, it is preferred to use a hand-operated industrial hot-air type dryer, which has proved very effective. Tube 10 is then positioned where the first edgewise bend of conductor bundle 4 will occur, and tube 10 is heated so that it shrinks tightly about the bundle 4 at this location. Bundle 4 is then placed on a winding fixture or form 12, FIG. 2, which is pivotable at point 13. The winding form 12 is part of a coil-winding machine of a type well known to those skilled in the art, and includes side plates on form 12, not shown, positioned adjacent the conductors to be wound to hold the conductors upright during the winding process. In FIG. 2, it will be seen that the insulating tube 10 has been shrunk at a position on bundle 4 where it is wound about radius 14 of form 12. Tube 9 is now positioned on bundle 4 where bundle 4 will be bent around radius 15 of form 12, and tube 9 has heat applied thereto to shrink it about bundle 4 so that it tightly grasps the bundle at that location. The bundle 4 is then further wound by pivoting form 12 around its pivot point 13, and thus drawing the conductors 1, 2 and 3 forming bundle 4 from their respective reels. At this point, tubes 6, 7 and 8 are positioned where bundle 4 will next be bent around radius 14. Tube 7 is positioned so that it is located where knuckle 16 will be formed, as shown in FIG. 3 and tubes 6 and 8 are positioned on either side of tube 7 adjacent thereto for reasons hereinafter described. Tubes 6, 7 and 8 are then heated and shrunk on the bundle 4 to tightly grasp bundle 4. Bundle 4 is now bent around radius 14, and then tube 5 is located, heated and shrunk in place.

It will be noted in the two turn coil illustrated, both turns at end 17 thereof are made about radius 14. If an armature coil of more than two turns were made, the first bend is made about radius 14, the second bend at end 17 is made about radius 14, and succeeding bends at end 17 are made on top of the second bend so that when the wound bundle is pulled out the second and succeeding bends are nested, and the coil end turn formed by the first bend crosses over the coil end turns formed by the succeeding bends. This operation is necessary to obtain a formed coil with lead connectors 20, 21, FIG. 3, extending from the top and bottom of the coil for proper orientation in armature slots.

In FIG. 3 it will be noted that coil end turn 18 crosses over end turn 19 at two points, which are approximately at the locations designated as 22 and 23. These cross-over points are points of high electrical stress between turns and subject to abrasion by the assembled conductors rubbing upon one another due to heat expansion and contraction. Therefore, the tubes 6 and 8 are placed about the conductors forming one of the cross-over end turns. It will be apparent that the tubes 6, 7 and 8 could be formed as one tube; however, for manufacturing purposes, it is deemed more expedient to use tubes of identical length throughout the coil manufacturing operation.

As will be apparent, the tubes 5 and 11 may be inserted on the ends of bundle 4 after bundle 4 is formed into a coil on form 12. After bundle 4 is wound on form 12, it is removed therefrom and placed in a pull-out device of a type which is well known to those skilled in the art and expanded in a plane generally perpendicular to the plane in which it was wound to provide the formed armature coil of FIG. 3. In FIG. 3 it will be seen that the tubes 7 and 10 tightly grasp the conductor bundle 4 where the bundle 4 is formed into knuckles 16 and 24 at end 17 of the coil, and tube 9 tightly grasps bundle 4 where it is formed into knuckle 25 at the other end of the coil. Tubes 5 and 11 are located on the portion of bundle 4 which provides armature coil lead connections to a current-collecting device, such as a commutator. Tubes 5 and 11 are so positioned that they provide additional insulation thereon. Alternatively or additionally, heat-shrinkable insulating tubes could be positioned on the conductor bundle 4 where the armature lead portions 20 and 21 will emerge from the slots in the armature to thereby guard against fraying of the insulation at this point and possible grounding of an armature conductor to the armature. After the armature coil of FIG. 3 is formed, it receives a common insulating treatment which may comprise saturating the coil sides with shellac, heating to dry solvent from the shellac, chilling in a cold press to mold the conductor coil sides together, and wrapping the coil sides.

In practicing the invention, it is preferred to use heat-shrinkable insulating tubing of polyethylene terephthalate. This material, which has exceptional strength and a relatively high point of flow although it is a thermoplastic material, is marketed under the trade name Mylar by E. I. du Pont de Nemours and Co. Sheet material of polyethylene terephthalate may be post oriented so that upon application of heat thereto a degree of shrinkage determined by the degree of post orientation thereof may be realized. Polyethylene terephthalate in pre-formed tubing form of various diameter and thickness is available from the Stone Paper Tube Co. of Washington, D.C. This polyethylene terephthalate tubing with heat applied thereto will shrink approximately 30 percent of its original diameter, losing essentially none of its original physical strength and electrical properties. It is preferred to use an insulating tubing having an initial inside diameter 12 to 26 percent greater than the periphery of the conductor bundle about which it is shrunk so that upon shrinking of the tubing about the conductor bundle, it will tightly grasp and, through tensional stresses in the tubing, clamp together the conductors of a bundle at a predetermined location. If other heat-shrinkable insulating tubing is used, the diameter thereof will be selected dependent on the percentage shrink of the material upon application of heat thereto. It has been found that tubing with a wall thickness of 0.002 mil is satisfactory in practicing the invention; however, tubing having other wall thickness is available and may be utilized. The wall thickness should be selected in accordance with the dielectric stress and abrasion it must withstand. We have found that tubing of polyethylene terephthalate, upon shrinking has sufficient flexibility to withstand the bending stresses imposed thereon by edgewise bending of the conductor to form the coil.

In heating polyethylene terephthalate to cause shrinkage thereof, an industrial type hot air hand-operated blower of 750° F. rating has been used. Polyethylene terephthalate has a melting point of approximately 250° C., and shrinkage thereof is a time-temperature function. Application of hot air about the tubing with the above-mentioned blower causes very fast increase in temperature of the polyethylene tubing and immediate shrinkage of the tubing tightly about the coil bundle. The heat, of course, is not held on the tubing a length of time which would cause melting thereof.

The tubing which is shrunk about the conductors of a bundle holds the conductors of the bundle tightly together, and thus causes any of the insulating fiber which breaks away from the conductors upon bending thereof to be retained in position between the conductors. Also, the tubing retains any of the fibers which break away on the periphery of the conductor bundle. Therefore, if the insulating fiber is broken away from its conductor at bends therein, it is held in position and still properly spaces the conductors of a bundle from one another.

Another advantage presented by pratcice of the invention and resulting elimination of the patching and taping technique, is more efficient heat transfer from the coil knuckles at end 17 of the coil. The knuckles at end 17, upon rotation of the armature upon which the coil is placed, provide a fan effect. Through use of the tubing instead of the patches and tapes, heat may be more readily transferred to the ambient atmosphere.

Also, since polyethylene terephthalate is transparent, the conductors of a bundle within the tubing may be inspected to see that the conductors of the bundle are properly positioned to minimize turn-to-turn and coil-to-coil electrical stresses. Such visual inspection was not possible with the patching and taping technique previously described.

While an embodiment of the invention and modifications thereof have been selected for purposes of disclosure, other modifications and utilization of the disclosed invention may occur to those skilled in the art which do not depart from the spirit and scope of the invention. Accordingly, it is intended to cover all modifications of the invention and changes in the illustrations which were chosen for purposes of disclosure which do not constitute departure from the spirit and scope of the invention.

What is claimed as new and is desired to secure by Letters Patent of the United States is:

1. In the process of manufacturing a formed coil wherein the coil comprises a plurality of rectangular cross-section conductors arranged with their major dimensions in side-by-side relationship to form a conductor bundle; the steps of applying pre-formed tubes of a heat-shrinkable insulating material of predetermined diameter on the conductor bundle at predetermined locations where bending of the bundle is to occur and applying heat to said tubes to cause said tubes to shrink about the bundle and hold the conductors thereof in compression; and thereafter forming said conductor bundle into a coil of predetermined configuration.

2. The process of claim 1 wherein the heat shrinkable tubes are of polyethylene terephthalate.

3. In the process of manufacturing a formed armature coil wherein the coil comprises a plurality of rectangular cross-section conductors arranged with their major dimensions in side-by-side relationship to form a conductor bundle; the steps of applying pre-formed tubes of a heat-shrinkable insulating material of predetermined diameter on the conductor bundle at locations where edgewise bending of the conductors of the bundle is to occur; applying heat to said tubes to cause said tubes to shrink about the bundle and hold the conductors thereof in compression; and thereafter forming said conductor bundle into a coil of predetermined configuration.

4. The process of claim 3 wherein the heat-shrinkable tubes are of polyethylene terephthalate.

5. The process of manufacturing a formal armature coil comprising: providing a plurality of rectangular cross-section conductors each having fiber-served insulation thereabout arranged with their major dimensions in side-by-side relationship to form a conductor bundle; placing pre-formed tubes of a heat-shrinkable insulating material of predetermined diameter on the conductor bundle; positioning a first of said tubes on said bundle where it is to be bent to form a coil turn; applying heat to said first tube to cause it to shrink about said bundle and hold the conductors thereof in compression; forming the coil turn where the tubing is positioned; and repeating the aforementioned positioning and heating steps for each coil turn.

6. The process of claim 5 wherein the tubing is polyethylene terephthalate.

7. The method of making formed electrical coils for use in dynamoelectric machines which comprises: providing a plurality of electrically insulated conductors arranged in side-by-side relationship to form a conductor bundle wherein said conductors are electrically separated from one another; applying preformed tubes of a heat-shrinkable material having a diameter of a predetermined size greater than the periphery of the conductor bundle at locations where bending of the conductors of said bundle is intended to take place; heating the tubes of heat-shrinkable material to shrink said tube about said conductor bundle to hold the conductors and the insulation thereof in compression and prevent rupture of the electric conductor insulation upon bending of the conductors of said bundle; and forming the conductor bundle into an electrical coil of predetermined shape for use in a dynamoelectric machine.

References Cited by the Examiner
UNITED STATES PATENTS

| | | | |
|---|---|---|---|
| 2,718,052 | 9/55 | Dexter | 29—155.5 |
| 2,836,744 | 5/58 | Clawson | 310—208 |
| 2,993,820 | 7/61 | Marshall | 310—208 |

JOHN F. CAMPBELL, *Primary Examiner.*